(12) United States Patent
Gupta et al.

(10) Patent No.: US 10,542,392 B2
(45) Date of Patent: *Jan. 21, 2020

(54) SYSTEM AND METHOD FOR MANAGING AUDIO CUT-IN POLICY IN MCPTT COMMUNICATION

(71) Applicant: Samsung Electronics Co., Ltd., Gyeonggi-do (KR)

(72) Inventors: Nishant Gupta, Bangalore (IN); Basavaraj Jayawant Pattan, Bangalore (IN); Suresh Chitturi, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/428,042

(22) Filed: May 31, 2019

(65) Prior Publication Data
US 2019/0289437 A1 Sep. 19, 2019

Related U.S. Application Data

(63) Continuation of application No. 15/651,554, filed on Jul. 17, 2017, now Pat. No. 10,313,844.

(30) Foreign Application Priority Data

Jul. 15, 2016 (IN) .................. 201641024348 PS
Mar. 30, 2017 (IN) .................. 201641024348 CS

(51) Int. Cl.
*H04W 4/10* (2009.01)
*H04M 3/56* (2006.01)
*H04L 29/06* (2006.01)

(52) U.S. Cl.
CPC .......... *H04W 4/10* (2013.01); *H04L 65/1083* (2013.01); *H04L 65/4038* (2013.01);
(Continued)

(58) Field of Classification Search
CPC ........................ H04W 4/10; H04L 65/4038
(Continued)

(56) References Cited

U.S. PATENT DOCUMENTS

2007/0112914 A1  5/2007  Sung et al.
2008/0194279 A1  8/2008  Choksi et al.
(Continued)

FOREIGN PATENT DOCUMENTS

WO   WO 2016/006908   1/2016
WO   WO 2016/111528   7/2016

OTHER PUBLICATIONS

ETSI, LTE; Mission Critical Push to Talk (MCPTT) Media Plane Control; Protocol Specification, (3GPP TS24.380 Version 13.0.2 Release 13), ETSI TS 124 380 V13.0.2, May 11, 2016, 209 Pages.
(Continued)

*Primary Examiner* — John J Lee
(74) *Attorney, Agent, or Firm* — The Farrell Law Firm, P.C.

(57) ABSTRACT

The present disclosure provides a method and system for managing mission critical push-to-talk (MCPTT) communication. The method includes receiving, by a floor control server, a first floor request message, from a primary floor participant, while a floor is granted to a secondary floor participant and a first media transmission is performed by the secondary floor participant; in response to receiving the first floor request message, transmitting, by the floor control server, to the secondary floor participant, a first floor revoke message for stopping the first media transmission of the secondary floor participant, and transmitting, by the floor control server, a first floor grant message to the primary floor participant; and transmitting, by the floor control server, a first floor taken message to the secondary floor participant,
(Continued)

wherein the first floor taken message includes information of the primary floor participant granted the floor.

10 Claims, 14 Drawing Sheets

(52) U.S. Cl.
CPC ........ *H04L 65/4061* (2013.01); *H04M 3/566* (2013.01); *H04M 3/568* (2013.01)

(58) Field of Classification Search
USPC .................. 455/517, 518, 519, 520, 67.11
See application file for complete search history.

(56) References Cited

U.S. PATENT DOCUMENTS

| | | | |
|---|---|---|---|
| 2008/0248792 A1* | 10/2008 | Gundu ................ | H04W 72/005 |
| | | | 455/422.1 |
| 2016/0295496 A1* | 10/2016 | Atarius ................ | H04W 76/14 |
| 2016/0381720 A1* | 12/2016 | Baek ...................... | H04W 8/14 |
| | | | 370/329 |

OTHER PUBLICATIONS

International Search Report dated Oct. 12, 2017 issued in counterpart application No. PCT/KR2017/007606, 13 pages.

3rd Generation Partnership Project; Technical Specification Group Core Network and Terminals Mission Critical Push to Talk (MCPTT) Media Plane Control; Protocol Specification, (Release 13), 3GPP TS 24.380 V13.1.1 , Jun. 2016, 217 Pages.

European Search Report dated Feb. 14, 2019 issued in counterpart application No. 17828008.7-1213, 12 pages.

* cited by examiner

SYSTEM AND METHOD FOR MANAGING AUDIO CUT-IN POLICY IN MCPTT COMMUNICATION

PRIORITY

This application is a Continuation of U.S. application Ser. No. 15/651,554, which was filed in the U.S. Patent and Trademark Office on Jul. 17, 2017, and claims priority under 35 U.S.C. § 119 to Indian Provisional Patent Application Serial No. 201641024348 (PS), which was filed in the Indian Patent Office on Jul. 15, 2016, and Indian Complete Patent Application Serial No. 201641024348 (CS), which was filed in the Indian Patent Office on Mar. 30, 2017, the entire disclosure of each of which is incorporated herein by reference.

BACKGROUND

1. Field of the Disclosure

The present disclosure relates generally to a mission critical push-to-talk (MCPTT) system, and more particularly to a method and system for managing an audio cut-in policy in an MCPTT system.

2. Description of the Related Art

In conventional MCPTT systems, every group member is assigned a priority. This priority is used during floor control to allow a group member with a higher priority to override a group member with a lower priority and, thus, transmit media immediately. Accordingly, no group member is allowed to interrupt any other group member unless the interrupting group member has a higher priority than the speaking group member. When floor requests are made by group members having the same priority, the floor requests are queued and typically serviced on a first come, first serve basis.

There may be certain special groups in which the group members may require the ability to communicate as soon as possible. For example, in a very important person (VIP) security group, timely information may be vital for the successful outcome of an operation. In such cases, it becomes very important for a group member to be able to update other group members of a situation immediately and without the limitations or delays that come with priority-based grants and queuing. As a result, waiting for another group member to complete media transmission may result in fatal or near-fatal outcomes.

SUMMARY

The present disclosure has been made to address at least the above-mentioned problems and/or disadvantages and to provide at least the advantages described below.

Accordingly, an aspect of the present disclosure is to provide a method and system for managing an audio cut-in functionality in a mission critical push-to-talk (MCPTT) communication system.

Accordingly, another aspect of the present disclosure is to provide a method for receiving, by a floor control server, a floor request message from a primary floor participant while the floor is granted to a secondary floor participant for a media transmission.

Accordingly, another aspect of the present disclosure is to provide a method for applying, by a floor control server, an audio cut-in policy in response to a floor request message received from a primary floor participant.

Accordingly, another aspect of the present disclosure is to provide a method for granting, by a floor control server, the floor to a primary floor participant in response to applying/enabling an audio cut-in policy.

Accordingly, another aspect of the present disclosure is to provide a method for receiving, by a floor control server, a floor release message from a primary floor participant.

Accordingly, another aspect of the present disclosure is to provide a method for applying, by a floor control server, an arbitration based on audio cut-in release policy.

Accordingly, another aspect of the present disclosure is to provide a method for granting, by a floor control server, the floor to a secondary floor participant in response to applying/enabling an arbitration based on an audio cut-in release policy.

Accordingly, another aspect of the present disclosure is to provide a method for receiving, by a floor control server, a floor request message from a primary floor participant and a tertiary floor participant while the floor is granted to a secondary floor participant for a media transmission.

Accordingly, another aspect of the present disclosure is to provide a method for applying, by a floor control server, an audio cut-in policy for a primary floor participant in response to determining that the floor request message from the primary floor participant is the latest and is not a floor request received from a tertiary floor participant.

Accordingly, another aspect of the present disclosure is to provide a method for granting, by a floor control server, the floor to a primary floor participant in response to applying/enabling an audio cut-in policy.

Accordingly, another aspect of the present disclosure is to provide a method and system to allow any group member to interrupt a transmission of all other group members, irrespective of priorities of the group members or floor control-based queuing mechanisms.

Accordingly, another aspect of the present disclosure is to provide a method to configure groups such that an administrator may enable or disable audio cut-in functionality.

Accordingly, another aspect of the present disclosure is to provide a method to allow a dynamic switch between enabling and disabling audio cut-in functionality for a group for use in situations where, for example, the same group is used for both VIP-like operations and normal public safety operations.

Accordingly, another aspect of the present disclosure is to provide methods to follow when a group member releases the floor after completing transmission.

In accordance with an aspect of the present disclosure, a method is provided for managing mission critical push-to-talk (MCPTT) communication. The method includes receiving, by a floor control server, a first floor request message, from a primary floor participant, while a floor is granted to a secondary floor participant and a first media transmission is performed by the secondary floor participant; in response to receiving the first floor request message, transmitting, by the floor control server, to the secondary floor participant, a first floor revoke message for stopping the first media transmission of the secondary floor participant, and transmitting, by the floor control server, a first floor grant message to the primary floor participant; and transmitting, by the floor control server, a first floor taken message to the secondary floor participant, wherein the first floor taken message includes information of the primary floor participant granted the floor.

In accordance with another aspect of the present disclosure, a floor control server is provided for managing mission critical push-to-talk (MCPTT) communication. The floor control server includes a transceiver; and at least one processor configured to control the transceiver to receive, from a primary floor participant, a floor request message while a floor is granted to the secondary floor participant and a first media transmission is performed by the secondary floor participant, in response to receiving the first floor request message, transmit, to the secondary floor participant, a first floor revoke message for stopping the first media transmission of the secondary floor participant, and transmit a first floor grant message to the primary floor participant, and transmit a first floor taken message to the secondary floor participant. The first floor taken message includes information of the primary floor participant granted the floor.

BRIEF DESCRIPTION OF THE DRAWINGS

The above and other aspects, features, and advantages of the present disclosure will be more apparent from the following description taken in conjunction with the accompanying drawings, in which.

DISCLOSURE

Figure 1:
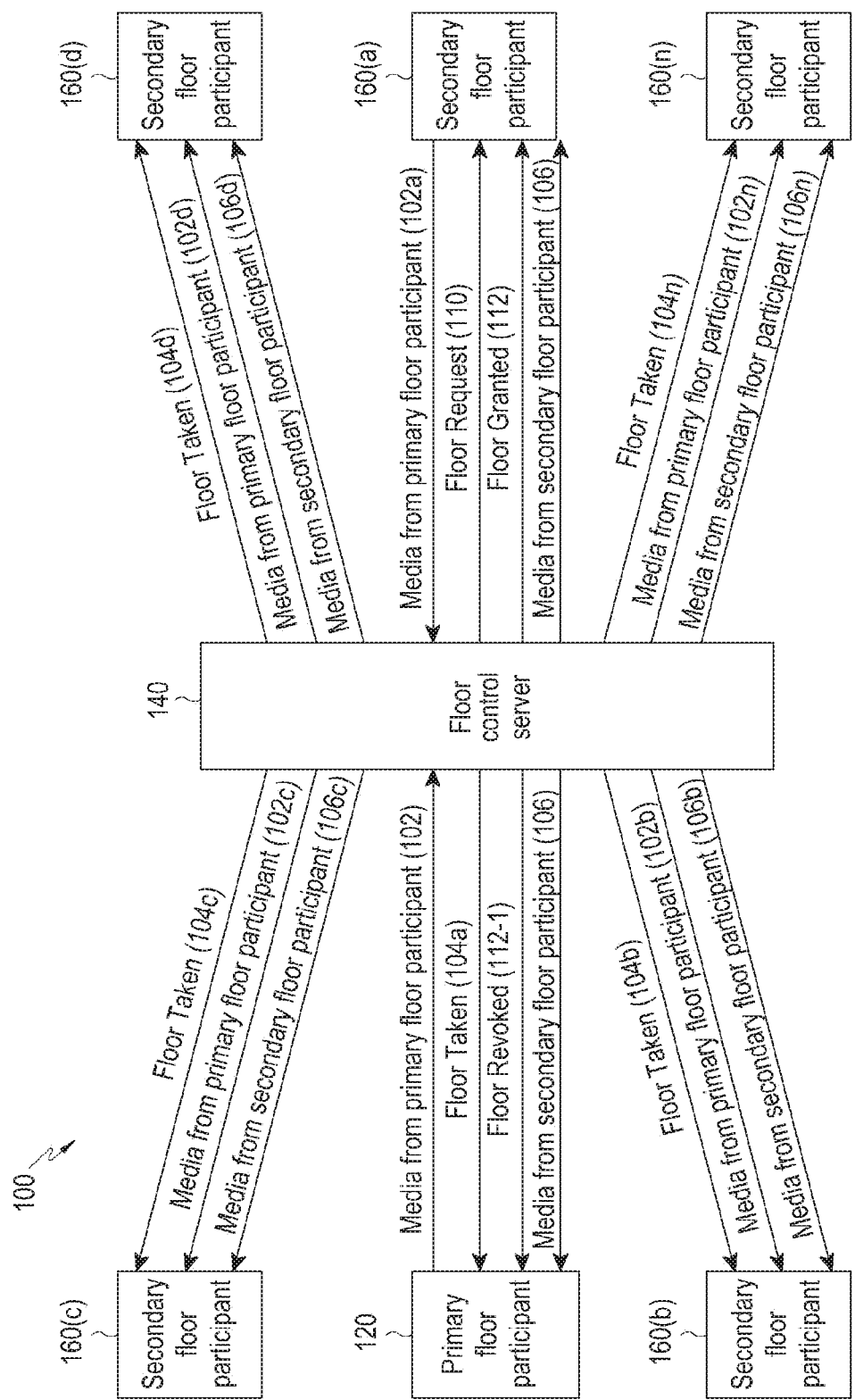
FIG. 1 illustrates an overview of a single mission critical push-to-talk (MCPTT) system for managing floor control arbitration with an audio cut-in policy enabled, according to an embodiment of the present disclosure.

Various embodiments of the present disclosure will be described in detail with reference to the accompanying drawings, in which similar elements may be marked by similar reference numerals. In the following description, specific details such as detailed configuration and components are merely provided to assist in the overall understanding of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The various embodiments described herein are not necessarily mutually exclusive, as some embodiments can be combined with one or more other embodiments to form new embodiments.

The term "or" as used herein, refers to a non-exclusive "or", unless otherwise indicated.

The examples used herein are intended merely to facilitate an understanding of ways in which the embodiments of the present disclosure can be practiced and to further enable those skilled in the art to practice the embodiments of the present disclosure. Accordingly, the examples provided herein should not be construed as limiting the scope of the present disclosure.

The present disclosure may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block may be physically separated into two or more interacting and discrete blocks without departing from the scope of the present disclosure. Likewise, the blocks may be physically combined into more complex blocks without departing from the scope of the disclosure.

The "primary" floor participant, the "secondary" floor participant and the "tertiary" floor participant are merely used for labeling purposes.

According to an embodiment of the present disclosure, a method for managing floor control arbitration in a mission critical push-to-talk (MCPTT) communication is provided. The method includes receiving, by a floor control server, a floor request message from a primary floor participant while the floor is granted to a secondary floor participant for a media transmission. Further, the method includes applying, by the floor control server, the audio cut-in policy. Furthermore, the method includes granting, by the floor control server, the floor to the primary floor participant.

According to another embodiment of the present disclosure, a method for managing floor control arbitration in a MCPTT communication is provided. The method includes receiving, by a floor control server, a floor request message from a primary floor participant and a floor request message from a tertiary floor participant, while the floor is granted to a secondary floor participant for a media transmission. Further, the method includes applying, by the floor control server, an audio cut-in policy in response to determining that the floor request message from the primary floor participate is latest and not the floor request message received from the tertiary floor participant. Furthermore, the method includes granting, by the floor control server, the floor to the primary floor participant.

Unlike conventional MCPTT systems and methods, the method of the present disclosure enables special groups in which the floor control allows any group member to instantly interrupt the transmission of all other group members.

Further, unlike the conventional systems and methods, where no group member is allowed to instantly interrupt any other group member unless the interrupting group member has a higher priority than the speaking group member, the method of the present disclosure provides/allows the most recent group member requesting the floor, to instantly interrupt the current speaker and transmit media without waiting for the current speaker to complete transmission, irrespective of the priorities of the group members or any other considerations.

Further, the present disclosure allows configuring groups to enable the audio cut-in functionality/policy.

Further, the present disclosure provides for dynamically switching between enabling and disabling of the audio cut-in functionality.

Further, the present disclosure provides methods to follow when a group member releases the floor after completing transmission.

FIG. 1 illustrates an overview of a single mission critical push-to-talk (MCPTT) system for managing floor control arbitration with an audio cut-in policy enabled, according to an embodiment of the present disclosure.

Referring to FIG. 1, an overview of an MCPTT system 100 for managing floor control arbitration with an audio cut-in policy enabled is provided.

The MCPTT system 100 includes a primary floor participant 120, a floor control server 140, and at least one secondary floor participant 160(a) to 160(n). It is to be understood that any number of primary floor participant 120 can be shown in the MCPTT system 100 without departing from the scope of the disclosure. There can be one or more primary floor participant, one or more secondary floor participant and one or more tertiary floor participant communicating media (e.g., voice, video, etc.) in a session.

The primary floor participant 120 and the secondary floor participant 160(a) to 160(n) can include a primary MCPTT client and a secondary MCPTT client, respectively. The primary MCPTT client/primary floor participant 120 and the secondary MCPTT client/secondary floor participant 160(a) to 160(n) can be, for example, a user equipment (UE), a laptop, a desktop computer, a mobile phone, a mobile terminal, a mobile station, a smart phone, personal digital assistants (PDAs), a tablet, a phablet, a consumer electronic device, a dual display device, or any other electronic device.

The floor control server 140 can be, for example, an MCPTT server or a component of an MCPTT server. The floor control server 140 is configured to grant the floor to the primary floor participant 120 and the secondary floor participant 160 in order to communicate media between the participants. FIG. 1 illustrates a sequence of steps performed between the primary floor participant 120, the floor control server 140, and the at least one secondary floor participant 160 in the MCPTT system 100.

Once a call (i.e., an MCPTT call, a push-to-talk (PTT) call) is established between the primary floor participant 120 and the at least one secondary floor participant 160(a) to 160(n), and assuming that the primary floor participant 120 is granted the floor, then at steps 102, 102a, 102b, 102c, 102d, 102n, the primary floor participant 120 communicates media with the at least one secondary floor participant 160(a) to 160(n).

At step 110, the floor control server 140 receives a floor request message from one secondary participant 160(a) of the at least one secondary participant 160(a) to 160(n).

Once the floor control server 140 receives the floor control request from the secondary floor participant 160(a) the floor control server 140 enables or applies the audio cut-in policy and immediately grants the floor to the secondary floor participant 160(a). That is, at step 112 and 112-1, respectively, the floor control server 140 sends a floor grant message to the secondary floor participant 160(a) and sends a floor revoked message to the primary floor participant 160(a).

Thus, by virtue of the audio cut-in policy enabled/applied by the floor control server 140, the secondary floor participant 160(a) is enabled to communicate the media by instantly interrupting the media transmission of the primary floor participant 120.

At steps 104a, 104b, 104c, 104d, 104n, the floor control server 140 communicates a floor taken message to the primary floor participant 120 and to at least one secondary floor participant 160(b) to 160(n). The floor taken message includes information of the secondary floor participant 160 (a), to whom the floor has been granted. Thus, the floor control server 140 can communicate the media received from the secondary floor participant 160(a) to the primary floor participant 120 and to at least one secondary participant 160(b) to 160(n).

FIG. 1 illustrates an example of an MCPTT system 100, but it is to be understood that other embodiments of an MCPTT system according to the present disclosure are not limited thereto. For example, in other embodiments, the MCPTT system 100 may include less or more primary floor participants and secondary floor participants. Further, one or more primary floor participants may interact with the secondary floor participant for establishing the call in the MCPTT communication.

Figure 2:
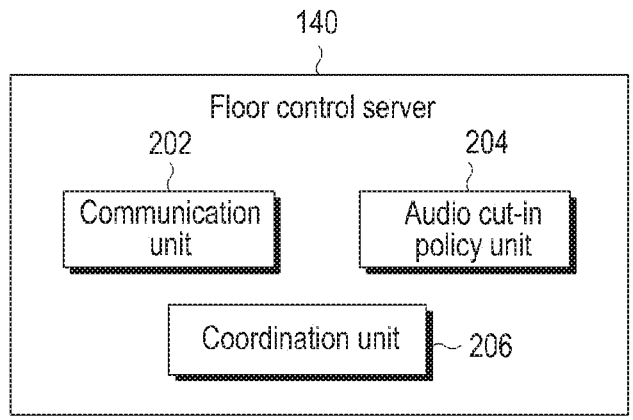
FIG. 2 is a block diagram of a floor control server for managing an MCPTT communication in a single MCPTT system with an audio cut-in policy enabled, according to an embodiment of the present disclosure.

FIG. 2 is a block diagram of a floor control server for managing an MCPTT communication in a single MCPTT system with an audio cut-in policy enabled, according to an embodiment of the present disclosure.

Referring to FIG. 2, a floor control server 140 for managing MCPTT communication in the MCPTT system 100 with an audio cut-in policy enabled is provided.

The floor control server 140 includes a communication unit 202, an audio cut-in policy unit 204, and a coordination unit 206.

The communication unit 202 receives a floor request message from the primary floor participant 120 while the floor is granted to the secondary floor participant 160(a). The audio cut-in policy unit 204, coupled to the communication unit 202, applies/enables the audio cut-in policy. The audio cut-in policy is enabled based on one or more configuration parameters configured by one or more group member of the primary floor participant 120 and the secondary floor participant 160(a). The audio cut-in policy unit 204 can, additionally, instantly interrupt the media transmission of the secondary floor participant 120.

The coordination unit 206 coupled to the audio cut-in policy unit 204 grants the floor to the primary floor participant 160(a) once the audio cut-in policy is applied. The coordination unit 206 additionally transmits a floor revoked message to the secondary floor participant 160(a). Further, the coordination unit 206 transmits a floor grant message to the primary floor participant 120 and a floor taken message to the secondary floor participant 160(a), the floor taken message includes information (e.g., identity of the user, identity of the server, message sequence number, etc.) of the primary floor participant 120.

Further, the communication unit 202 may receive a floor release message from the primary floor participant 120. The audio cut-in policy unit 204 may apply an arbitration based on an audio cut-in release policy. For e.g., arbitration based on an audio cut-in policy allows any communication participant (i.e., primary, secondary, tertiary, or the like) to instantly interrupt the transmission of all other participants, irrespective of the priorities of other participants and overrides any queue based floor control mechanisms. In this case, while the audio cut-in policy is enabled, the queue is disabled. In case of simultaneous floor requests from different participants, the last request received is processed (i.e., granted) and other participants which sent floor requests receive a floor reject.

Figure 5:
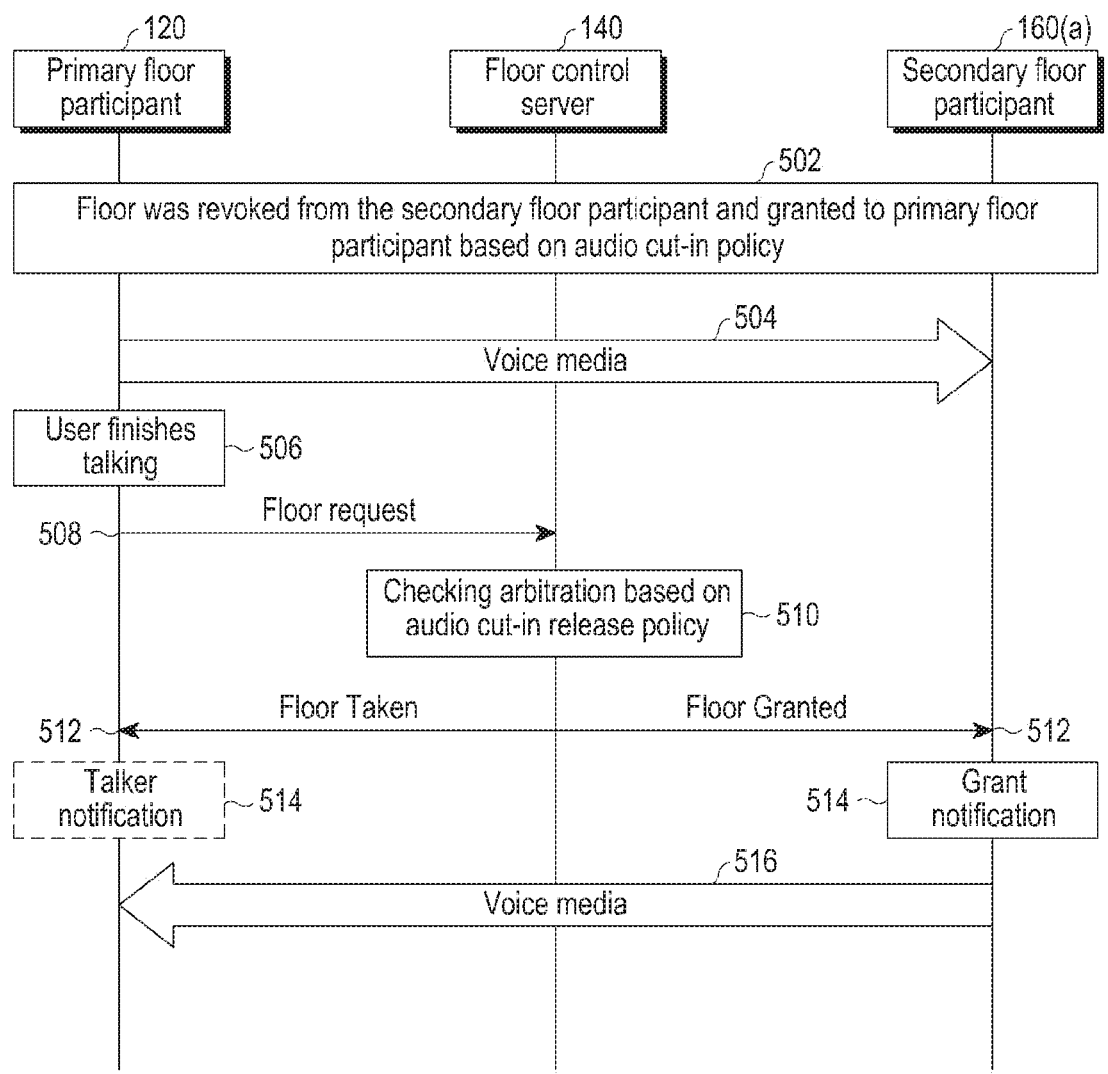
FIG. 5 is a sequence diagram of a method for managing a floor release with a floor grant to a pre-empted floor participant in a single MCPTT system, according to an embodiment of the present disclosure.

Alternatively, the coordination unit 206 may grant the floor to the secondary floor participant and transmit a floor taken message to the primary floor participant 120 and a floor grant message to the secondary floor participant 160(a), the floor taken message includes information of the secondary floor participant, as detailed with respect to FIG. 5.

Figure 6:
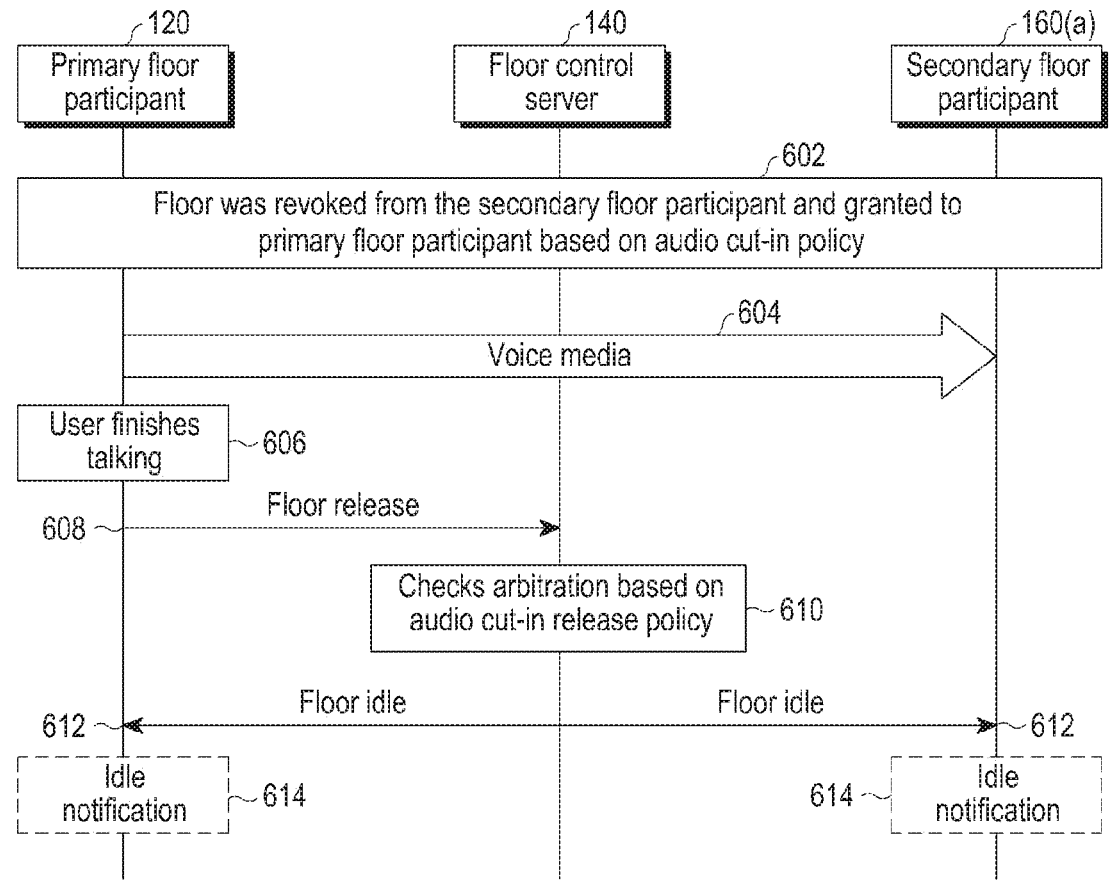
FIG. 6 is a sequence diagram of a method for managing a floor release with a floor idle in a single MCPTT system, according to an embodiment of the present disclosure.

Alternatively, the coordination unit 206 may transmit a floor idle message to the primary floor participant 120 and the secondary floor participant 160(a), as detailed with respect to FIG. 6.

The communication unit 202 receives a first floor request message from a primary floor participant and a second floor request message from a tertiary floor participant, while a floor is granted to the secondary floor participant. The audio cut-in policy unit 204 applies an audio cut-in policy in response to determining that the first floor request message from the primary floor participate is latest floor request message received. The coordination unit 206 grants the floor to the primary floor participant while terminating a media transmission of the secondary floor participant by revoking the floor from the secondary floor participant, and transmits a floor grant message to the primary floor participant and a floor taken message to the secondary floor participant and the tertiary floor participant, wherein the floor taken message includes information of the primary floor participant.

Further, the coordination unit 206 transmits a floor revoked message to the secondary floor participant and terminate the media transmission.

Figure 3:
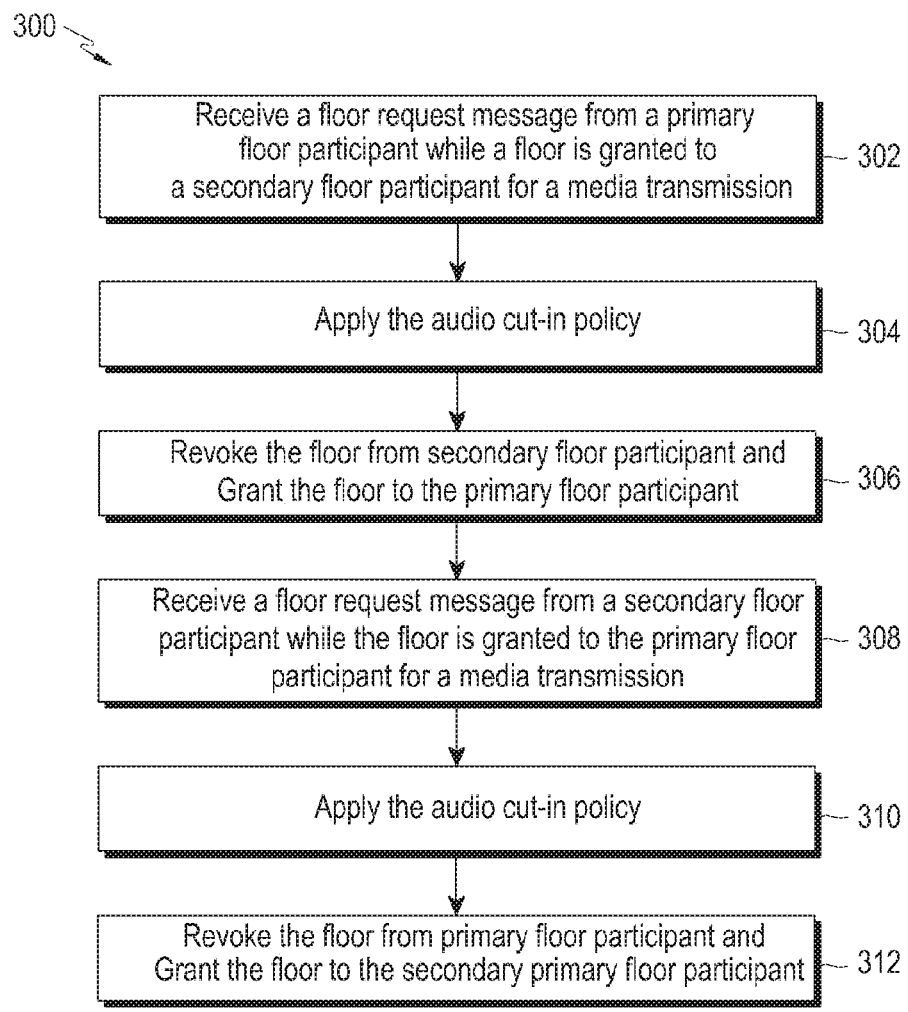
FIG. 3 is a flow diagram of a method for managing floor control arbitration with an audio cut-in policy enabled for a primary floor participant and a secondary floor participant in a single MCPTT system, according to an embodiment of the present disclosure.

FIG. 3 is a flow diagram of a method for managing floor control arbitration with an audio cut-in policy enabled for a primary floor participant and a secondary floor participant in a single MCPTT system, according to an embodiment of the present disclosure.

Referring to FIG. 3, a flow diagram 300 describing a method for applying the audio cut-in policy to the primary floor participant 120 and to the secondary floor participant 160(a) in the MCPTT system 100 is provided.

At step 302, the floor control server 140 receives a floor request message from the primary floor participant 120 while the floor is granted to the secondary floor participant 160(a) for the media transmission. For example, the communication unit 202 of the floor control server 140 receives the floor request message from the primary floor participant 120 while the floor is granted to the secondary floor participant 160(a) for the media transmission.

At step 304, the floor control server 140 applies the audio cut-in policy in response to the floor request message received from the primary floor participant 120. For example, the audio cut-in policy unit 204 of the floor control server 140 applies the audio cut-in policy in response to the floor request message received from the primary floor participant 120.

At step 306, the floor control server 140 revokes the floor from the secondary floor participant 160(a) and grants the floor to the primary floor participant 120. For example, the coordination unit 206 of the floor control server 140 revokes the floor from the secondary floor participant 160(a) and grants the floor to the primary floor participant 120.

Thus, the primary floor participant 120 can transmit the media to the secondary floor participant 160(a) or to at least one secondary floor participant 160(b) to 160(n).

At step 308, the floor control server 140 receives a floor request message from the secondary floor participant 160(a) while the floor is granted to the primary floor participant 120 for the media transmission (e.g., voice, video, etc.). For example, the communication unit 202 of the floor control server 140 receives the floor request message from the secondary floor participant 160(a) while the floor is granted to the primary floor participant 120 for the media transmission.

At step 310, the floor control server 140 applies the audio cut-in policy in response to the floor request message received from the secondary floor participant 160(a). For example, the audio cut-in policy unit 204 of the floor control server 140 applies the audio cut-in policy in response to the floor request message received from the secondary floor participant 160(a).

At step 312, the floor control server 140 revokes the floor from the primary floor participant 120 and grants the floor to the secondary floor participant 160(a). For example, the coordination unit 206 of the floor control server 140 revokes the floor from the primary floor participant 120 and grants the floor to the secondary floor participant 160(a).

The various actions, acts, blocks, steps, etc., as illustrated in the FIG. 3 may be performed in the order presented, in a different order, or simultaneously. Further, in some embodiments, some of the actions, acts, blocks, steps, etc., may be omitted, added, modified, skipped, etc., without departing from the scope of the disclosure.

Figure 4:
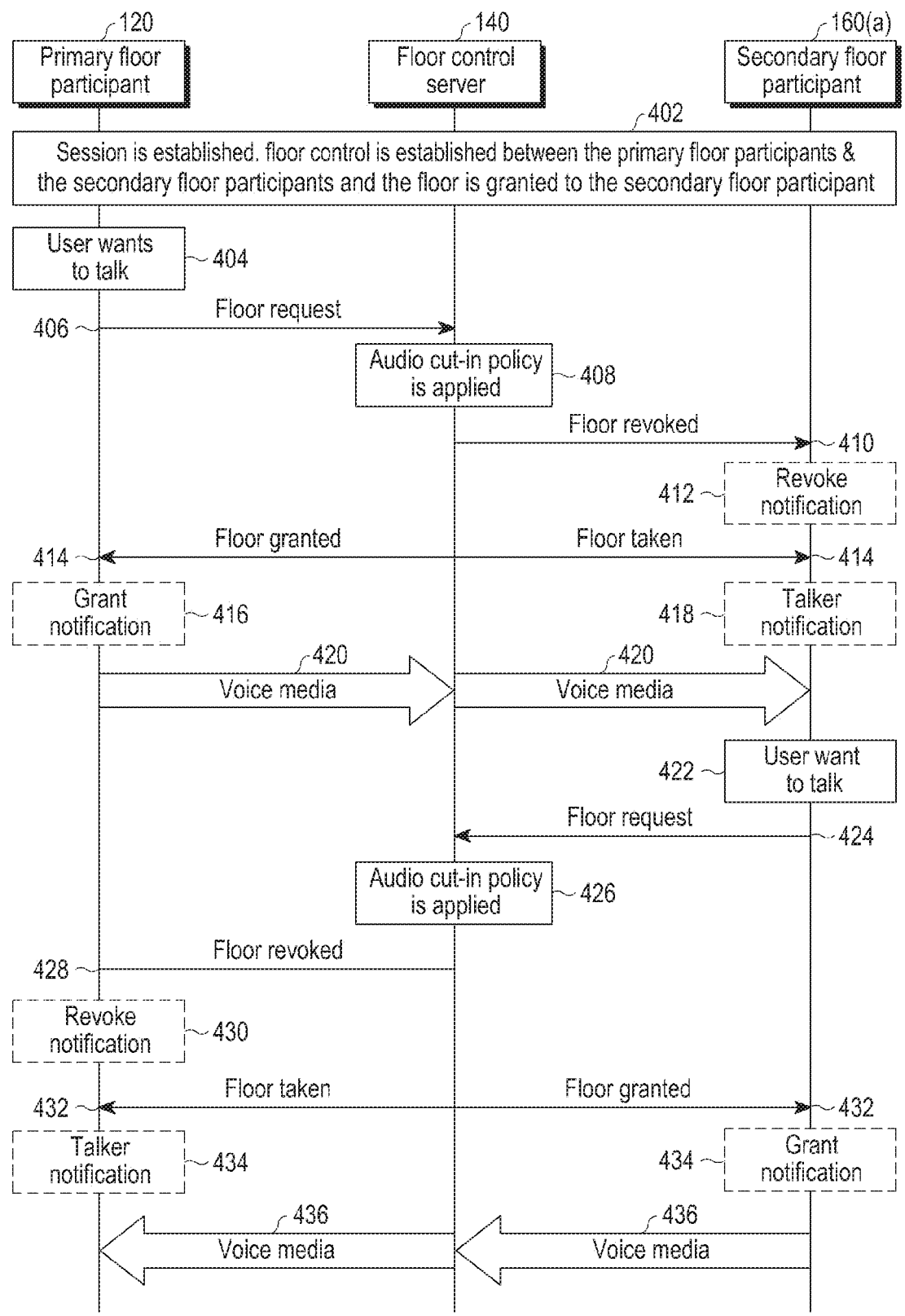
FIG. 4 is a sequence diagram of a method for managing floor control arbitration with an audio cut-in policy enabled in a single MCPTT system, according to an embodiment of the present disclosure.

FIG. 4 is a sequence diagram of a method for managing floor control arbitration with an audio cut-in policy enabled in a single MCPTT system, according to an embodiment of the present disclosure.

Referring to FIG. 4, an application plane procedure for managing floor control arbitration with an audio cut-in policy enabled in the MCPTT system 100 is provided. The MCPTT system 100 includes the floor control server 140 and a group of members including the primary floor participant 120 and a secondary floor participant 160(a). The floor control server 140 provides floor control arbitration for the group when the group has an audio cut-in policy enabled by an authorized administrator of the group. While the audio cut-in policy is enabled, the floor control arbitration allows any group member to instantly interrupt the transmission of all other group members.

At step 402, when a session (i.e., an MCPTT call, a PTT call, etc.) is established, floor control is established between the primary floor participant 120 and the secondary floor participant 160(a). Here, it is assumed that the floor is granted to the secondary floor participant 160(a) for media transmission (e.g., voice, video, etc.) to the primary floor participant 120.

At step 404, when the primary floor participant 120 needs to communicate media or a response (i.e., the user wants to talk) to the secondary floor participant 160(a), then at step 406, the primary floor participant 120 sends a floor request message to the floor control server 140.

At step 408, the floor control server 140 applies the audio cut-in policy in response to the floor request message received from the primary floor participant 120.

At step 410, the floor control server 140 sends the floor revoked message to the secondary floor participant 160(a).

At step 412, the secondary MCPTT client provides a floor revoke notification (i.e., by displaying a notification, outputting a sound, such as a beep or a ringtone, or by any other means of notifying which are known in the art) to the secondary floor participant 160(a).

At step 414, the floor control server 140 communicates the floor taken message to the secondary floor participant 160(a) and the floor grant message to the primary floor participant 120.

At step 416, the primary MCPTT client provides a floor grant notification (i.e., by displaying a notification, outputting a sound, such as a beep or a ringtone, or by any other means of notifying which are known in the art) to the primary floor participant 120.

At step 418, the secondary MCPTT client provides a talker notification to the secondary floor participant 160(a).

Thus, at step 420, the primary floor participant 120 can transmit media (e.g., voice, video, etc.) to the floor control server 140, and floor control server 140 transmits the media to the secondary floor participant 160(a).

At step 422, when the secondary floor participant 160(a) needs to communicate media or a response (i.e., user wants to talk) to the primary floor participant 120, then at step 424, the secondary floor participant 160(a) sends a floor request message to the floor control server 140. The floor control server 140 receives the floor request message from the secondary floor participant 160(a).

At step 426, the floor control server 140 applies the audio cut-in policy in response to the floor request message received from the secondary floor participant 160(a).

At step 428, the floor control server 140 sends a floor revoked message to the primary floor participant 120.

At step 430, the primary MCPTT client provides a floor revoke notification (i.e., by displaying a message, outputting a sound, such as a beep or a ringtone, or by any other means of notifying which are known in the art) to the primary floor participant 120.

At step 432, the floor control server 140 communicates a floor taken message to the primary floor participant 120 and a floor grant message to the secondary floor participant 160(a).

At step 434, the secondary MCPTT client provides a floor grant notification (i.e., by displaying a message, outputting a sound, such as a beep or a ringtone, or by any other means of notifying which are known in the art) to the secondary floor participant 160(a); and the primary MCPTT client provides a talker notification to the primary floor participant 120.

Thus, at step 436, the secondary floor participant 160(a) can transmit media to the floor control server 140 and the floor control server 140 c transmits the media to the primary floor participant 120.

FIG. 5 is a sequence diagram of a method for managing a floor release with a floor grant to a pre-empted floor participant in a single MCPTT system, according to an embodiment of the present disclosure.

Referring to FIG. 5, an application plane procedure for managing a floor release with a floor grant to pre-empted floor participant in the MCPTT system 100 is provided. The MCPTT system 100 includes the floor control server 140, the primary floor participant 120, and the secondary floor participant 160(a).

At step 502, it is assumed that the floor was revoked from the secondary floor participant 160(a) and granted to the primary floor participant 120 based on the audio cut-in policy.

At step 504, the primary floor participant 120 transmits media (e.g., voice, video, etc.) to the secondary floor participant 160(a). The floor control server 140 keeps track of the chain of floor overrides by primary floor participant 120.

At step 506, once a user of the primary floor participant 120 completes transmission of media over the session, and there is no new floor request, the floor control server 140 implicitly grants the floor to the secondary floor participant 160(a).

At step 508, the floor control server 140 receives a floor release message from the primary floor participant 120.

At step 510, when the floor control server 140 receives the floor release message, the floor control server 140 checks the arbitration policy for floor release when the audio cut-in policy is enabled.

At step 512, the floor control server 140 transmits the floor grant message to the secondary floor participant 160(a) and the floor taken message to the primary floor participant 120.

At step 514, the secondary MCPTT client provides a floor grant notification (i.e., by displaying a message, outputting a sound, such as a beep or a ringtone, or by any other means of notifying which are known in the art) to the secondary floor participant 160(a); and the primary MCPTT client provides a talker notification to the primary floor participant 120.

Thus, at step 516, the secondary floor participant 160(a) can transmit media to the primary floor participant 120.

FIG. 6 is a sequence diagram of a method for managing a floor release with a floor idle in a single MCPTT system, according to an embodiment of the present disclosure.

Referring to FIG. 6, an application plane procedure for managing a floor release with a floor idle in the MCPTT system 100 is provided. The MCPTT system 100 includes the floor control server 140, the primary floor participant 120, and the secondary floor participant 160(a).

At step 602, it is assumed that the floor was revoked from the secondary floor participant 160(a) and granted to the primary floor participant 120 based on the audio cut-in policy.

At step 604, the primary floor participant 120 transmits media (e.g., voice, video, etc.) to the secondary floor participant 160(a). Here, the floor control server 140 does not keep track of the chain of overrides by the primary floor participant 120.

At step 606, once a user of the primary floor participant 120 completes transmission of the media over the session, and there is no floor request message, then the floor control server 104 implicitly puts the floor in an idle state. Any participant wishing to transmit media can request the floor.

At step 608, the floor control server 140 receives a floor release message from the primary floor participant 120.

At step 610, when the floor control server 140 receives the floor release message, the floor control server 140 checks the arbitration policy for floor release when the audio cut-in policy is enabled.

At step 612, the floor control server 140 transmits the floor idle message to the secondary floor participant 160(a) and to the primary floor participant 120.

At step 614, the secondary MCPTT client provides a floor idle notification (i.e., by displaying a message, outputting a sound, such as a beep or a ringtone, or by any other means of notifying which are known in the art) to the secondary floor participant 160(a) and the primary MCPTT client provides a floor idle notification to the primary floor participant 120.

Figure 7:
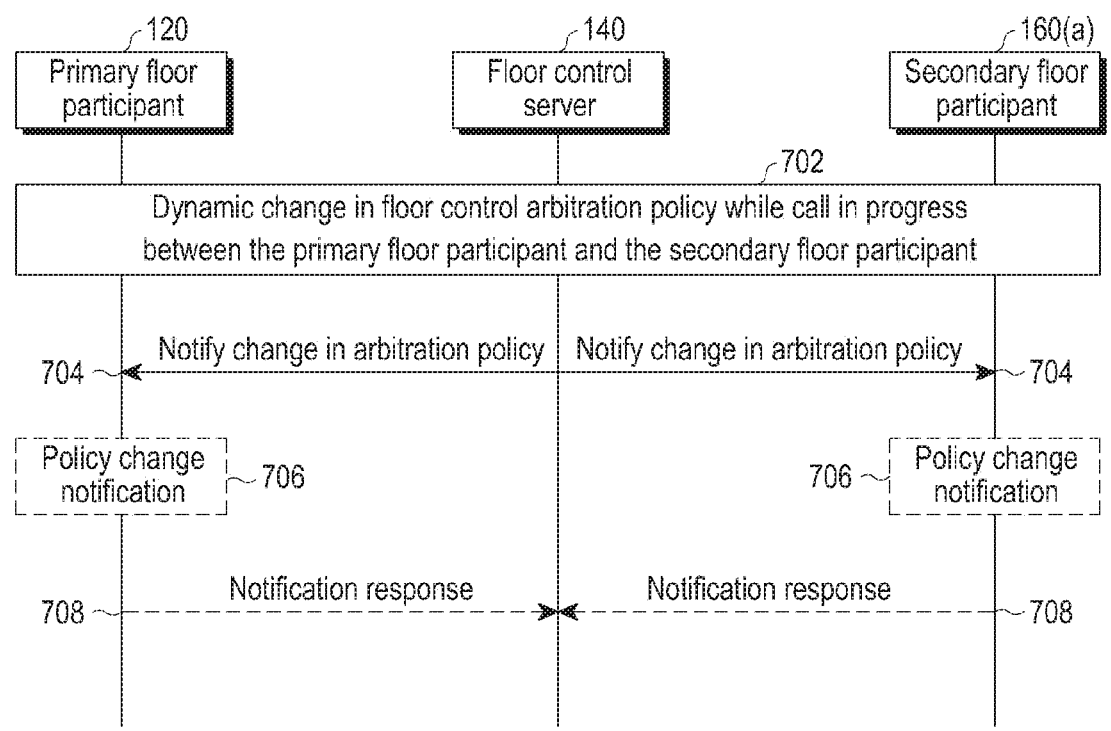
FIG. 7 is a sequence diagram of a method for notifying of a change in arbitration based on an audio cut-in policy in a single MCPTT system, according to an embodiment of the present disclosure.

FIG. 7 is a sequence diagram of a method for notifying of a change in arbitration based on an audio cut-in policy in a single MCPTT system, according to an embodiment of the present disclosure.

Referring to FIG. 7, an application plane procedure for notifying a change in arbitration based on an audio cut-in policy in the MCPTT system 100 is provided. The MCPTT system 100 includes the floor control server 140, the primary floor participant 120, and the secondary floor participant 160. That is, in FIG. 7, a method is provided for notifying participants of an in-progress call about the change in a floor control arbitration policy. Once the floor control arbitration policy is dynamically updated, a group management server notifies the MCPTT server about the change in group configuration data (or the configuration parameters). The MCPTT server, in effect, notifies the floor control server 140 about the change in the floor control arbitration policy. Thus, the MCPTT server can notify the primary floor participant 120 and the at least one secondary floor participant 160(a) to 160(n) of an in-progress call about the change in the policy. A change in the floor control arbitration policy can be for, e.g., enabling or disabling an audio cut-in policy.

At step 702, the floor control server 140 receives a notification from the MCPTT server about the dynamic change in the floor control arbitration policy while a call is in progress between the primary floor participant 120 and the secondary floor participant 160(a).

At step 704, the floor control server 140 notifies the primary floor participant 120 and the secondary floor participant 160(a) about the change in the floor control arbitration policy.

At step 706, a policy change notification is provided to the users of the primary floor participant 120 and the secondary floor participant 160(a).

At step 708, the floor control server 140 receives a notification response from the primary floor participant 120 and the secondary floor participant 160(a).

Figure 8:
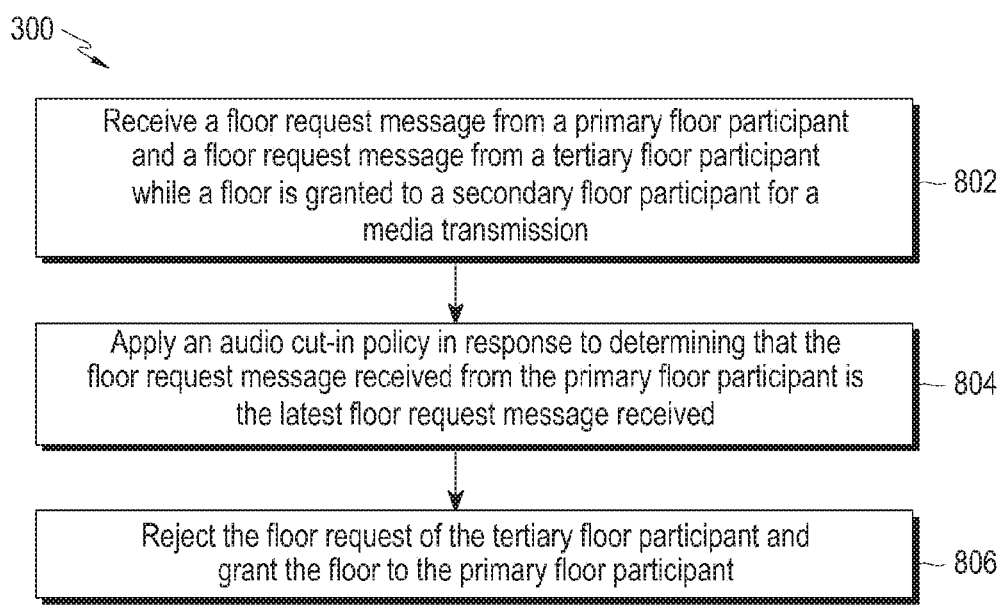
FIG. 8 is a flow diagram of a method for managing floor control arbitration with an audio cut-in policy in a single MCPTT system involving one or more floor participants, according to an embodiment of the present disclosure.

FIG. 8 is a flow diagram of a method for managing floor control arbitration with an audio cut-in policy in a single MCPTT system involving one or more floor participants, according to an embodiment of the present disclosure.

Referring to FIG. 8, another method for managing floor control arbitration with an audio cut-in policy in the MCPTT system 100 involving one or more floor participants is provided.

At step 802, the floor control server 140 receives a floor request message from the primary floor participant 120 and a floor request message from a tertiary floor participant 180 while the floor is granted to the secondary floor participant 160(a) for a media transmission (e.g., voice, video, etc.). For example, the communication unit 202 of the floor control server 140 receives a floor request message from the primary floor participant 120 and a floor request message from the tertiary floor participant 180 while the floor is granted to the secondary floor participant 160(a) for the media transmission.

At step 804, the floor control server 140 applies the audio cut-in policy for the primary floor participant 120 in response to determining that the floor request message received from the primary floor participant 120 is the latest floor request message received. For example, the audio cut-in policy unit 204 of the floor control server 140 applies the audio cut-in policy for the primary floor participant 120 in response to determining that the floor request message received is latest and not the floor request message from the tertiary floor participant 180.

At step 806, the floor control server 140 rejects the floor request from the tertiary floor participant 180 and grants the floor to the primary floor participant 120. For example, the coordination unit 206 of the floor control server 140 grants the floor to the primary floor participant 120.

Figure 9:
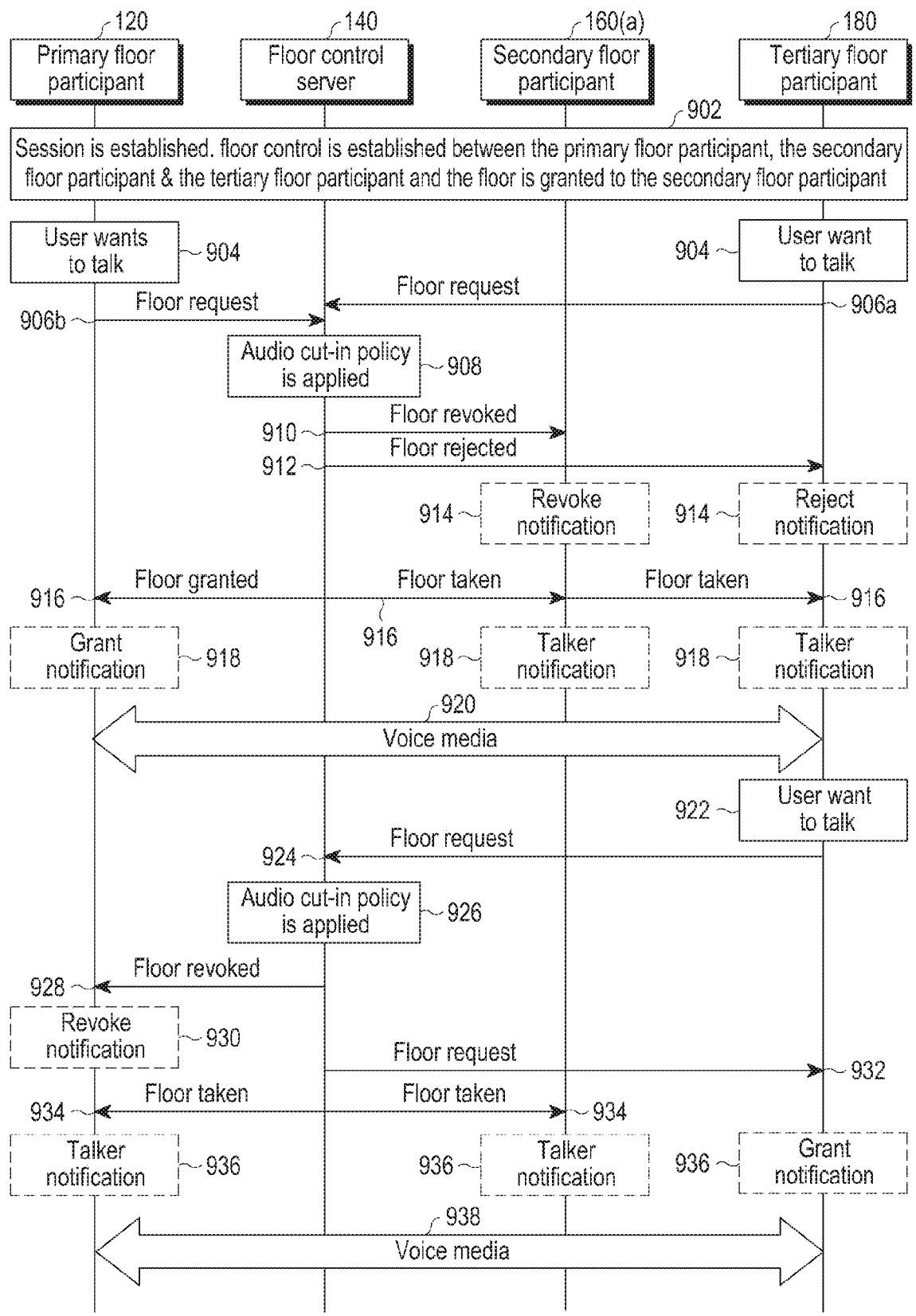
FIG. 9 is a sequence diagram of a method for managing floor control arbitration with an audio cut-in policy in a single MCPTT system involving one or more floor participants, according to an embodiment of the present disclosure.

FIG. 9 is a sequence diagram of a method for managing floor control arbitration with an audio cut-in policy in a single MCPTT system involving one or more floor participants, according to an embodiment of the present disclosure.

Referring to FIG. 9, an application plane procedure for managing the floor control arbitration with an audio cut-in policy enabled in the MCPTT system 100 involving one or more floor participants is provided. The MCPTT system 100 includes the floor control server 140, the primary floor participant 120, the secondary floor participant 160(a), and the tertiary floor participant 180.

At step 902, when a session (i.e., an MCPTT call or a PTT call) is established floor control is established between the primary floor participant 120, the secondary floor participant 160(a) and the tertiary floor participant 180. Here, it is assumed that the floor is granted to the secondary floor participant 160(a) for media transmission (e.g., voice, video, etc.) to the primary floor participant 120 and tertiary floor participant 180.

At step 904, if the tertiary floor participant 180 needs to communicate media or a response (i.e., the user wants to talk), then at step 906a, the tertiary floor participant 180 sends a floor request message to the floor control server 140. The floor control server 140 receives the floor request message from the tertiary floor participant 180.

Alternatively, at step 904, if the primary floor participant 120 needs to communicate media or a response (i.e., the user wants to talk), then at step 906b, the primary floor participant 120 sends a floor request message to the floor control server 140. The floor control server 140 receives the floor request message from the primary floor participant 120.

Thus, if the floor control server 140 receives the one or more floor control requests at the same time, then the floor control server 140 grants the floor to the floor control participant who sent the latest floor control request message (e.g., using a last-in-first-out list). For example, in this case, the floor control server 140 grants the floor to the primary floor participant 120.

In step 908, the floor control server 140 applies the audio cut-in policy in response to determining that the floor request message received from the primary floor participant 120 is the latest.

At step 910, the floor control server 140 sends a floor revoked message to the secondary floor participant 160(*a*).

At step 912, the floor control server 140 sends a floor reject message to the tertiary floor participant 180.

At step 914, the secondary MCPTT client provides a revoke notification to the secondary floor participant 160(*a*); and a tertiary MCPTT client provides a reject notification to the tertiary floor participant 180.

At step 916, the floor control server 140 sends a floor granted message to the primary floor participant 120, and a floor taken message to the secondary floor participant 160(*a*) and the tertiary floor participant 180.

At step 918, the primary MCPTT client provides a floor grant notification to the primary floor participant 160(*a*); and the secondary MCPTT client and the tertiary MCPTT client provide a talker notification to the secondary floor participant 160(*a*) and the tertiary floor participant 180, respectively.

Thus, at step 920 the primary floor participant 120 can transmit the media (e.g., voice, video, etc.) to the secondary floor participant 160(*a*) and the tertiary floor participant 180.

At step 922, when the tertiary floor participant 180 needs to communicate then, at step 924, the floor control server receives a floor control request message from the tertiary floor participant 180.

At step 926, the floor control server 140 applies/enables the audio cut-in policy and, at step 928, sends a floor revoked message to the primary floor participant 120.

At step 930, the primary MCPTT client provides a floor revoked notification to the primary floor participant 120 and, at step 932, sends a floor grant message to the tertiary floor participant 180.

At step 934, the floor control server 140 sends a floor taken message to the primary floor participant 120 and the secondary floor participant 160(*a*).

At step 936, the primary MCPTT client provides a talker notification to the primary floor participant 160(*a*), the secondary MCPTT client provides a talker notification to the secondary floor participant 160(*a*), and the tertiary MCPTT client provides a grant notification to the tertiary floor participant 180.

The floor control server 140 may keep track of the chain of floor overrides as an effect of audio cut-in policy, and then grant the floor following the same order after floor release from each floor participant, as described above. For example, if the floor was granted to primary floor participant 120, but was cut-in by the secondary floor participant 160(*a*), which was in turn cut-in by the tertiary floor participant 180, the floor control server 140 keeps track of all the floor overrides (e.g., using a last-in-first-out list) and grants the floor to the secondary floor participant 160(*a*) once released by tertiary floor participant 180, and later to the primary floor participant 120 when released by the secondary floor participant 160(*a*). Otherwise, the floor control server 140 may handle the race condition and may provide a floor reject message to reject the requests of all but one group member. (e.g., the secondary floor participant 160(*a*)).

Figure 10:
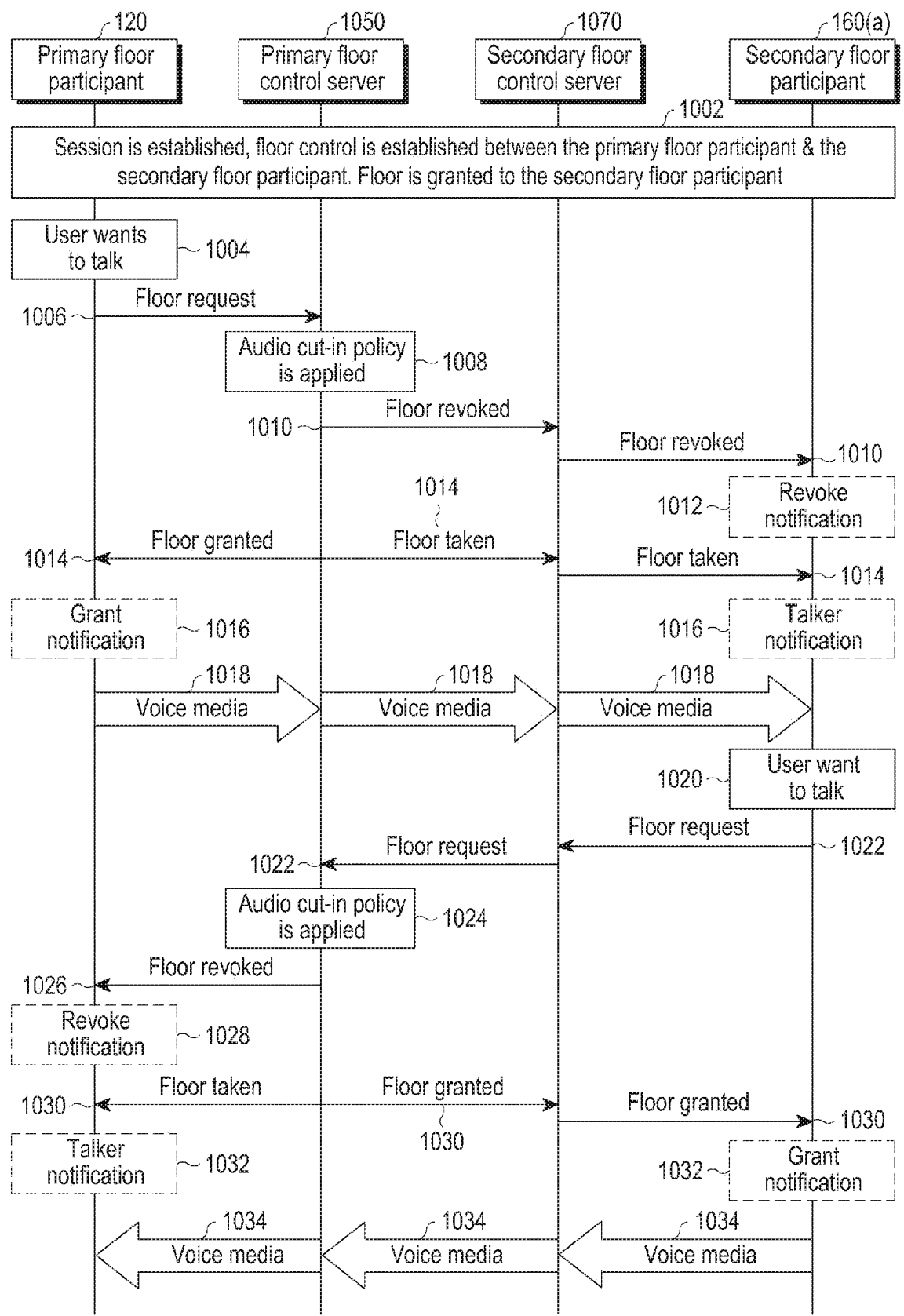
FIG. 10 is a sequence diagram of a method for managing floor control arbitration with an audio cut-in policy in multiple MCPTT systems involving one or more floor participants, according to an embodiment of the present disclosure.

FIG. 10 is a sequence diagram of a method for managing floor control arbitration with an audio cut-in policy in a multiple MCPTT system involving one or more floor participants, according to an embodiment of the present disclosure.

Referring to FIG. 10, an application plane procedure for managing floor control arbitration with audio cut-in policy in multiple MCPTT systems involving one or more floor participants is provided.

In FIG. 10, floor control arbitration is provided for a group whose members are part of multiple MCPTT systems. The group has an audio cut-in policy enabled. While the audio cut-in policy is enabled, the floor control arbitration allows any group member to instantly interrupt the transmission of all other group members. In effect, the most recent group member requesting the floor can be allowed to instantly interrupt the current speaker and transmit media (e.g., voice, video, etc.) without waiting for the current speaker to complete the transmission, irrespective of the priorities of the overriding group member or the overridden group member. Chronology of the floor requests is determined at a primary floor control server 1050. The primary floor control server 1050 may use, for e.g., the order in which the floor control requests are received. The group subjected to floor control arbitration can be a usual group or a temporary group created as a result to a group regroup operation Following are the steps involved:

At step 1002, when a session (i.e., an MCPTT call or a PTT call) is established floor control is established between the primary floor participant 120 of a primary floor control server 1050 and the secondary floor participant 160(*a*) of a secondary floor control server 1070. Here, it is assumed that the floor is granted to the secondary floor participant 160(*a*) of the secondary floor control server 1070 for media transmission (e.g., voice, video, etc.) to the primary floor participant 120 and to all other members of the group in the established session.

At step 1004, when the primary floor participant 120 needs to communicate media or a response (i.e., the user wants to talk), then at step 1006, the primary floor participant 120 sends a floor request message to the primary floor control server 1050. The primary floor control server 1050 receives the floor request message from the primary floor participant 120. If the primary floor control server 1050 is not a floor arbitrator of the MCPTT group call, the primary floor control server 1050 forwards the floor request message to a floor control server which is floor arbitrator of the MCPTT group call.

At step 1008, the primary floor control server 1050 determines that an audio cut-in policy is enabled which may indicate that the requesting primary floor participant 120 can immediately be granted the floor. This may also be subject to a policy on the number of times a participant can request the floor and an associated counter. The primary floor control server 1050 applies the audio cut-in policy in response to receiving the floor request message from the primary floor participant 120.

At step 1010, the primary floor control server 1050 sends a floor revoked message to the secondary floor control server 1070. The secondary floor control server 1070 forwards the floor revoked message to the secondary floor participant 160(*a*).

At step 1012, the secondary MCPTT client provides a revoke notification to the secondary floor participant 160(*a*).

At step 1014, the primary floor control server 1050 sends a floor granted message to the primary floor control participant 120 and a floor taken message to the secondary floor control server 1070, and the floor control server 1070 forwards the floor taken message to the secondary floor participant 160(*a*).

At step 1016, the primary MCPTT client provides a floor grant notification to the primary floor participant 160(*a*) and the secondary MCPTT client provides a talker notification to the secondary floor participant 160(*a*).

Thus, at step 1018, the primary floor participant 120 can transmit the media (e.g., voice, video, etc.) to the primary floor control server 1050, the secondary floor control server 1070, and the secondary floor participant 160(*a*).

At step 1020, when the secondary floor participant 160(*a*) needs to communicate, then at step 1022, the secondary floor control server 1070 receives a floor control request message from the secondary floor participant 160(*a*) and the secondary floor control server 1070 forwards the floor control request message to the primary floor control server 1050.

At step 1024, the primary floor control server 1050 applies the audio cut-in policy in response to the floor control request message received from the secondary floor control server 1070.

At step 1026, the primary floor control server 1050 sends a floor revoked message to the primary floor participant 120.

At step 1028, the primary MCPTT client provides a floor revoked notification to the primary floor participant 120.

At step 1030, the primary floor control server 1050 sends a floor grant message to the secondary floor control server 1070 and a floor taken message to the primary floor participant 120. The secondary floor control server 1070 forwards the floor grant message to the secondary floor participant 160(*a*).

The primary floor control server 1050 may limit the time a user, of the primary floor participant 120, talks (holds the floor).

At step 1032, the secondary MCPTT client provides a grant notification to the secondary floor participant 160(*a*) and the primary MCPTT client provides a talker notification to the primary floor participant 120.

At step 1034, the secondary floor participant 160(*a*) sends the media (e.g., voice, video, etc.) to the secondary floor control server 1070, which is then forwarded to the primary floor control server 1050 and thereon to the primary floor participant 120.

Figure 11A:
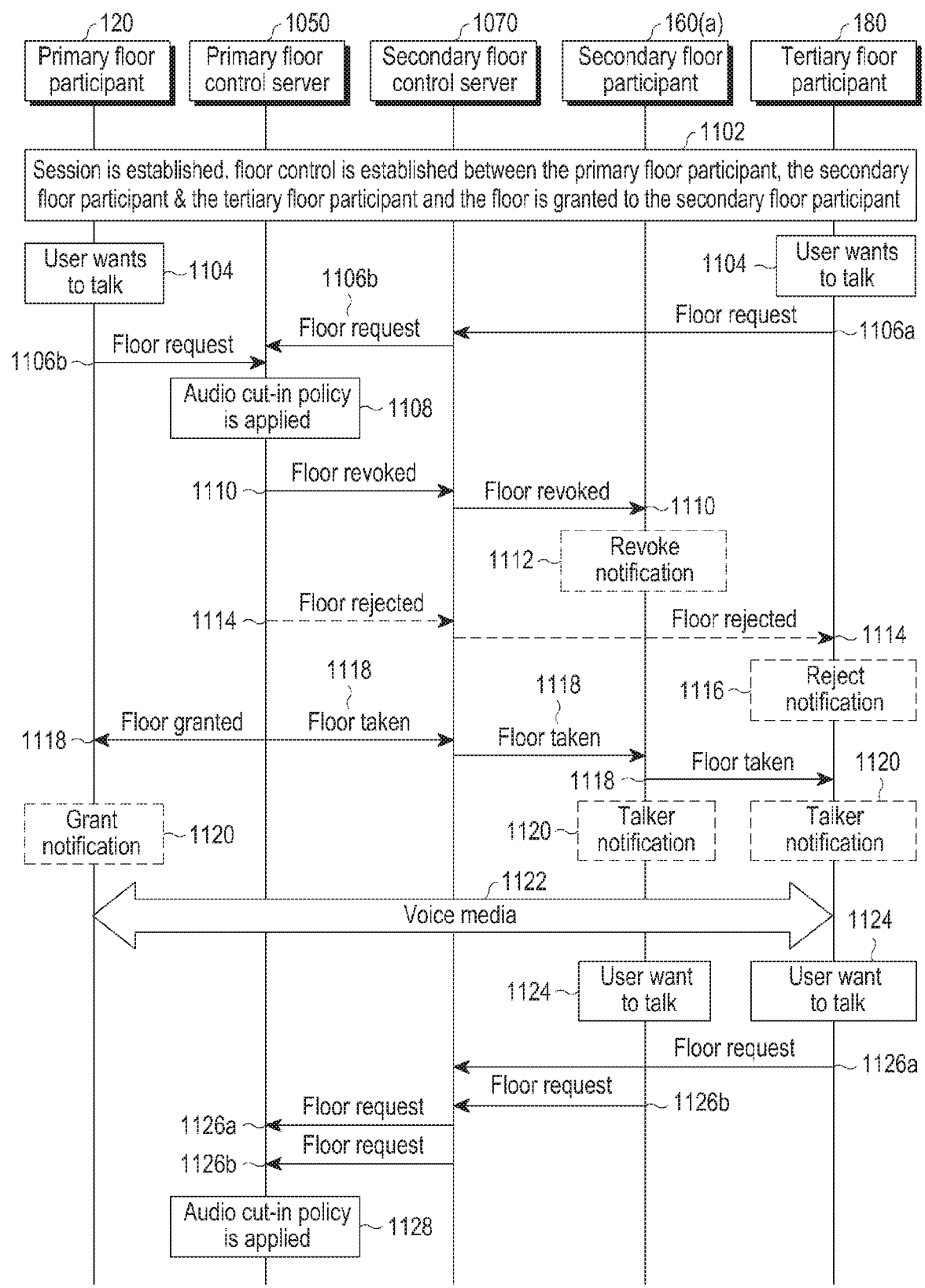
FIGS. 11A and 11B are sequence diagrams of a method for managing floor control arbitration with an audio cut-in policy in multiple MCPTT systems involving one or more floor participants, according to an embodiment of the present disclosure.
Figure 11B:
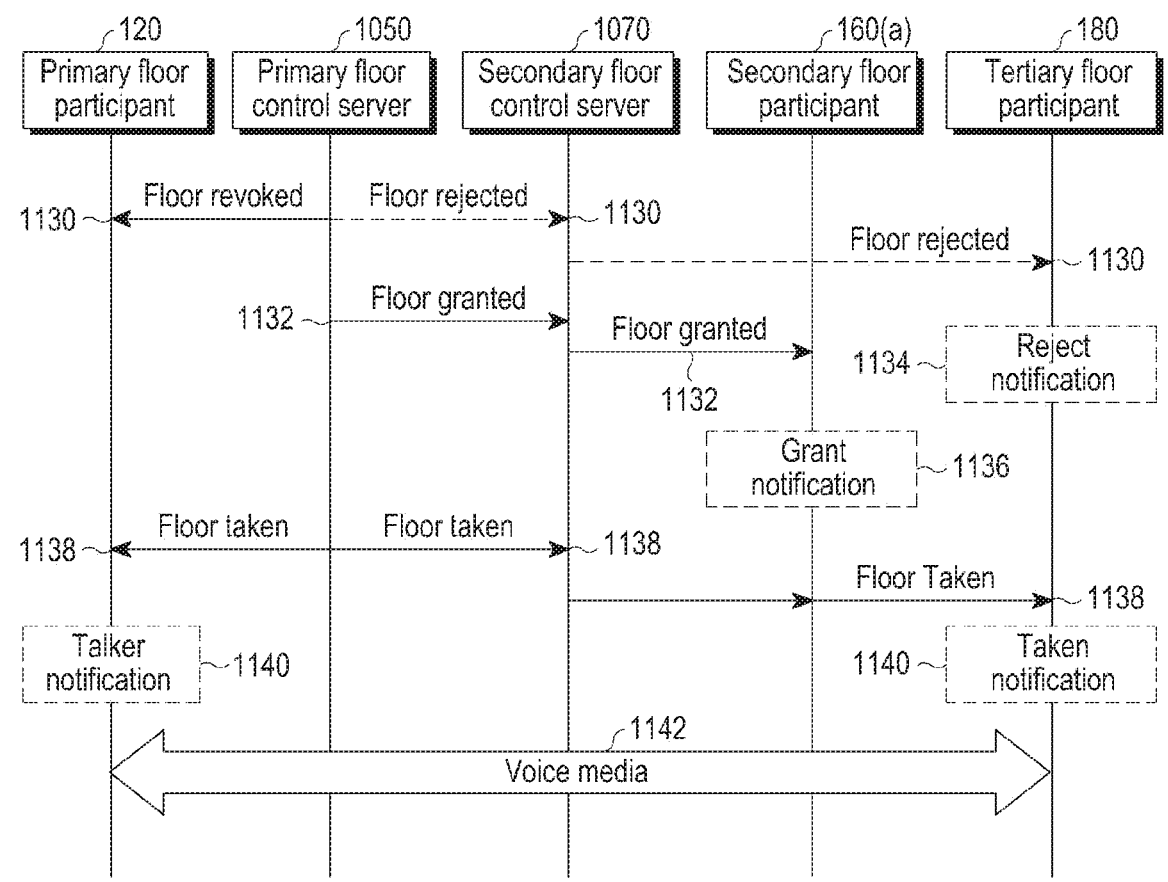

FIGS. 11A and 11B are sequence diagrams of a method for managing floor control arbitration with an audio cut-in policy in multiple MCPTT systems involving one or more floor participants, according to an embodiment of the present disclosure.

Referring to the FIGS. 11A and 11B, a primary floor control server 1050, a secondary floor control server 1070, a primary floor participant 120, a secondary floor participant 160(*a*), and a tertiary floor participant 180 are provided.

At step 1102, when a session (i.e., an MCPTT call or a PTT call) is established, floor control is established between the primary floor participant 120 of the primary floor control server 1050 and the secondary floor participant 160(*a*) and the tertiary floor participant 180 of the secondary floor control server 1070. Here, it is assumed that the floor is granted to the secondary floor participant 160(*a*) of the secondary floor control server 1070 for media transmission (e.g., voice, video, etc.) to the primary floor participant 120, the tertiary floor participant 180 and to all other members of the group in the established session.

At step 1104, if the tertiary floor participant 180 needs to communicate media or a response (i.e., the user wants to talk), then at step 1106*a*, the tertiary floor participant 180 sends a floor request message to the secondary floor control server 1070.

At step 1106*b*, the secondary floor control server 1070 forwards the floor request message received from the tertiary floor participant 180 to the primary floor control server 1050.

Alternatively, if the primary floor participant 120 needs to communicate media or a response (i.e., the user wants to talk), then at step 110*b*, the primary floor participant 120 sends a floor request message to the primary floor control server 1050. The primary floor control server 1050 receives the floor request message from the primary floor participant 120.

Thus, if the primary floor control server 1050 receives the one or more floor control request at the same time, then the primary floor control server 1050 grants the floor to the participant who sends the latest floor control request message (e.g., using a last-in-first-out list). For example, in this case, the primary floor control server 1050 grants the floor to the primary floor participant 120.

At step 1108, the primary floor control server 1050 applies the audio cut-in policy in response to determining that the floor request message received from the primary floor participant 120 is the latest request message received.

At step 1110, the primary floor control server 1050 sends a floor revoked message to the secondary floor control server 1070, and the secondary floor control server 1070 forwards the floor revoked message to the secondary floor participant 160(*a*).

At step 1112, the secondary MCPTT client provides a revoke notification to the secondary floor participant 160(*a*).

At step 1114, the primary floor control server 1050 sends a floor reject message to the secondary floor control server 1070, and the secondary floor control server 1070 forwards the floor reject message to the tertiary floor participant 180.

At step 1116, the tertiary MCPTT client provides a reject notification to the tertiary floor participant 180.

At step 1118, the primary floor control server 1050 sends a floor granted message to the primary floor participant 120 and a floor taken message to the secondary floor control server 1070, and the secondary floor control server 1070 forwards the floor taken message to the secondary floor participant 160(*a*) and to the tertiary floor participant 180.

At step 1120, the primary MCPTT client provides a floor grant notification to the primary floor participant 160(*a*), and the secondary MCPTT client and the tertiary MCPTT client provide a talker notification to the secondary floor participant 160(*a*) and the tertiary floor participant 180, respectively.

Thus, at step 1120, the primary floor participant 120 can transmit the media (e.g., voice, video, etc.) to the secondary floor participant 160(*a*) and the tertiary floor participant 180.

At step 1124, when the tertiary floor participant 180 and the secondary floor participant 160(*a*) need to communicate, then at step 1126*a*, the secondary floor control server 1070 receives a floor control request message from the tertiary floor participant 180, and at step 1126*b*, receives a floor control request message from the secondary floor participant 160*a*. The secondary floor control server 1070 forwards the floor control request messages received from the tertiary floor participant 180 and the secondary floor participant 160(*a*) to the primary floor control server 1050.

At step 1128, the primary floor control server 1050 applies the audio cut-in policy in response to determining that the floor request message received from the secondary floor participant 160(a) is the latest floor request message received and grants the floor to the secondary floor participant 160(a).

Referring to FIG. 11B, at step 1130, the primary floor control server 1050 sends a floor revoked message to the primary floor participant 120 and a floor rejected message to the secondary floor control server 1070. The secondary floor control server 1070 forwards the floor rejected message to the tertiary floor participant 180.

At step 1132, the primary floor control server 1050 sends a floor granted message to the secondary floor control server 1070, which then forwards the floor granted message to the secondary floor participant 160(a).

At step 1134, the tertiary MCPTT client provides a reject notification to the tertiary floor participant.

At step 1136, the secondary MCPTT client provides a grant notification to the secondary floor participant 160(a).

At step 1138, the primary floor control server 1050 sends a floor taken message to the primary floor participant 120 and the secondary floor control server 1070, and the secondary floor control server 1070 forwards the floor taken message to the secondary floor participant 160(a) and the tertiary floor participant 180.

At step 1140, the primary MCPTT client and the tertiary MCPTT client provide a talker notification to the primary floor participant 120 and the tertiary floor participant 180, respectively.

Thus, at step 1142, the secondary floor participant 160(a) can transmit the media (e.g., voice, video, etc.) to the primary floor participant 120 and the tertiary floor participant 180.

Figure 12:
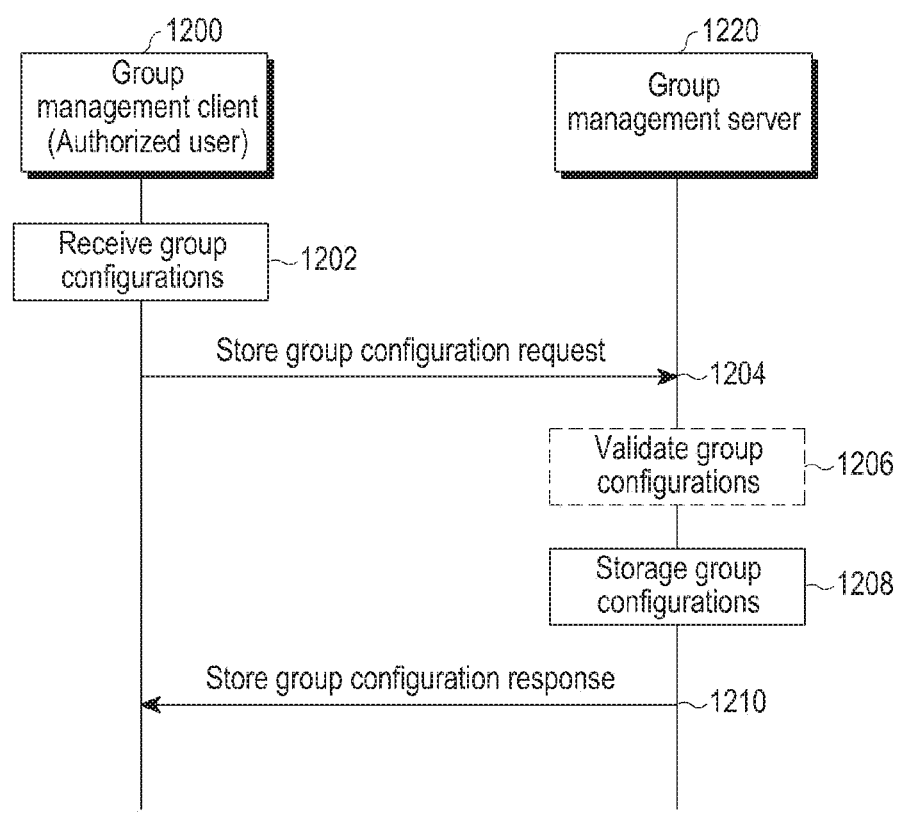
FIG. 12 is a sequence diagram of a method for managing an audio cut-in group configuration storage, according to an embodiment of the present disclosure.

FIG. 12 is a sequence diagram of a method for managing an audio cut-in group configuration storage, according to an embodiment of the present disclosure.

Referring to FIG. 12, an application plane procedure for managing an audio cut-in group configuration storage is provided.

At step 1202, a group management client 1200 of an authorized user receives group configuration data including an audio cut-in policy. The received group configuration data may contain configuration parameters to enable the audio cut-in policy for the group (for the users/MCPTT clients belonging to the group).

At step 1204, the group management client 1200 sends a store group configuration request message to a group management server 1220 to request storage of the group configuration data.

At step 1206, the group management server 1220 validates the group configuration data before storage.

At step 1208, the group management server 1220 stores the group configuration data.

At step 1210, the group management server 1220 provides a store group configuration response message to the group management client 1200 indicating success or failure of the validation or storage. If any validation or storage fails, the group management server 1200 provides a failure indication in the store group configuration response.

To enable audio cut-in functionality, the group configuration data contains a new configuration parameter as described below in Table 1.

TABLE 1

| Reference | Parameter description | MCPTT UE | MCPTT Server | Group management server |
|---|---|---|---|---|
| [R-6.2.3.6.2-001] | Audio cut-in policy (enabled/disabled) | N | Y | Y |

This configuration parameter is configured and used by an MCPTT user equipment (UE), an MCPTT server and the Group management server 1220. A value 'Y' indicates that the group is enabled for audio cut-in, while "N" indicates that the group is disabled for audio cut-in. The audio cut-in policy enforces the floor control server 140 to grant the floor for the latest floor control request message received by the floor control server 140. This allows the floor participant (e.g., the primary floor participant 120 or the secondary floor participant 160(a)) to transmit the media (e.g., voice, video, etc.) immediately without waiting for another group member to complete the media transmission. While the audio cut-in policy is enforced, the maximum number of simultaneously speaking group members is restricted to 1. The floor control server 140 may also restrict the transmission time allowed per floor request. The audio cut-in policy may also include, for example, the number of times the floor participant can request the floor, and a counter that may be implemented to enforce the limit at the floor control request received by the floor control server 140 or transmitted by the floor participant.

Figure 13:
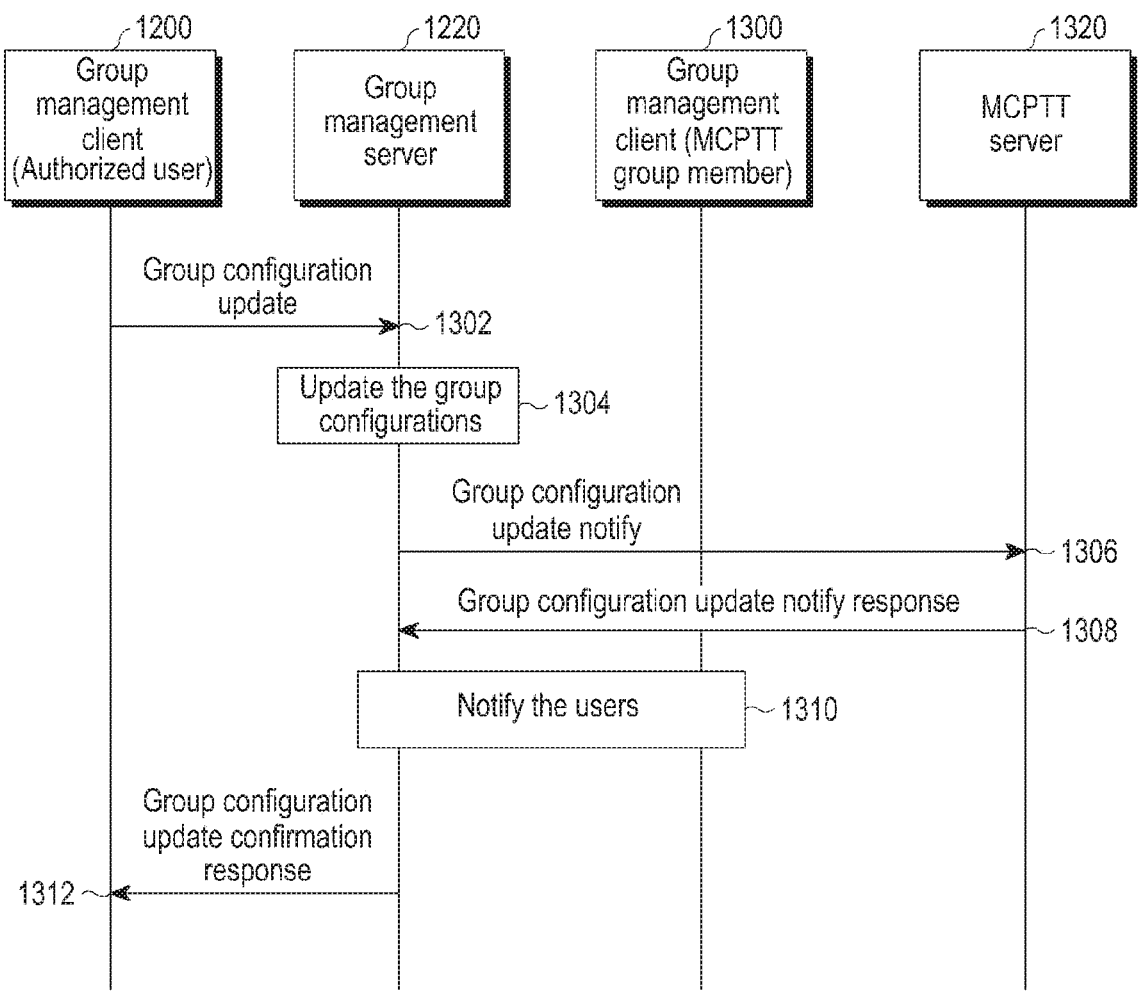
FIG. 13 is a sequence diagram of a method for managing dynamic group configuration in a single MCPTT system, according to an embodiment of the present disclosure.

FIG. 13 is a sequence diagram of a method for managing dynamic group configuration in a single MCPTT system, according to an embodiment of the present disclosure.

Referring to FIG. 13, an application plane procedure for managing dynamic group configuration in the MCPTT system 100 is provided.

In FIG. 13, the group subjected to update can be a normal group or a temporary group created as a result of a group-regroup operation, where multiple groups may be combined into a single group. A group-regroup operation combines multiple MCPTT groups and creates a single temporary MCPTT group. This temporary group has a temporary MCPTT group ID and all the members of the combined groups are members of the temporary group.

If a dynamic change to group configuration data happens while a group call is in-progress for the group being updated, the MCPTT server informs the floor control server 140 of any change relevant to the floor control arbitration, e.g., a change in audio cut-in policy. Subsequently, the group members may also be notified of the policy change.

At step 1302, the group management client 1200 of an administrator, dispatcher, or authorized MCPTT user sends a group configuration update request message to the group management server 1220. The identity of the group and the configuration parameters being updated shall be included in the message. For enabling audio cut-in, the request shall include an indication to enable audio cut-in. The request may include a temporary group ID in case of group-regroup groups.

At step 1304, the group management server 1220 updates the group configurations. During the group configuration update, the group management server 1220 updates the stored information of the group.

At step 1306, the group management server 1220 notifies an MCPTT server 1320 regarding the group configuration update with the information of the updated configuration parameters.

At step 1308, the MCPTT server 1320 confirms the notification and updates the relevant information in the server. The MCPTT server 1320 notifies a floor control server about the change in floor arbitration policy (for e.g. audio cut-in disabled to audio cut-in enable and vice versa).

At step 1310, the MCPTT group members are notified about the updated MCPTT group configuration data and the associated policy.

At step 1312, the group management server 1220 provides a group update confirmation response to the group management client 1200 of the administrator, dispatcher, or authorized MCPTT user.

Figure 14:
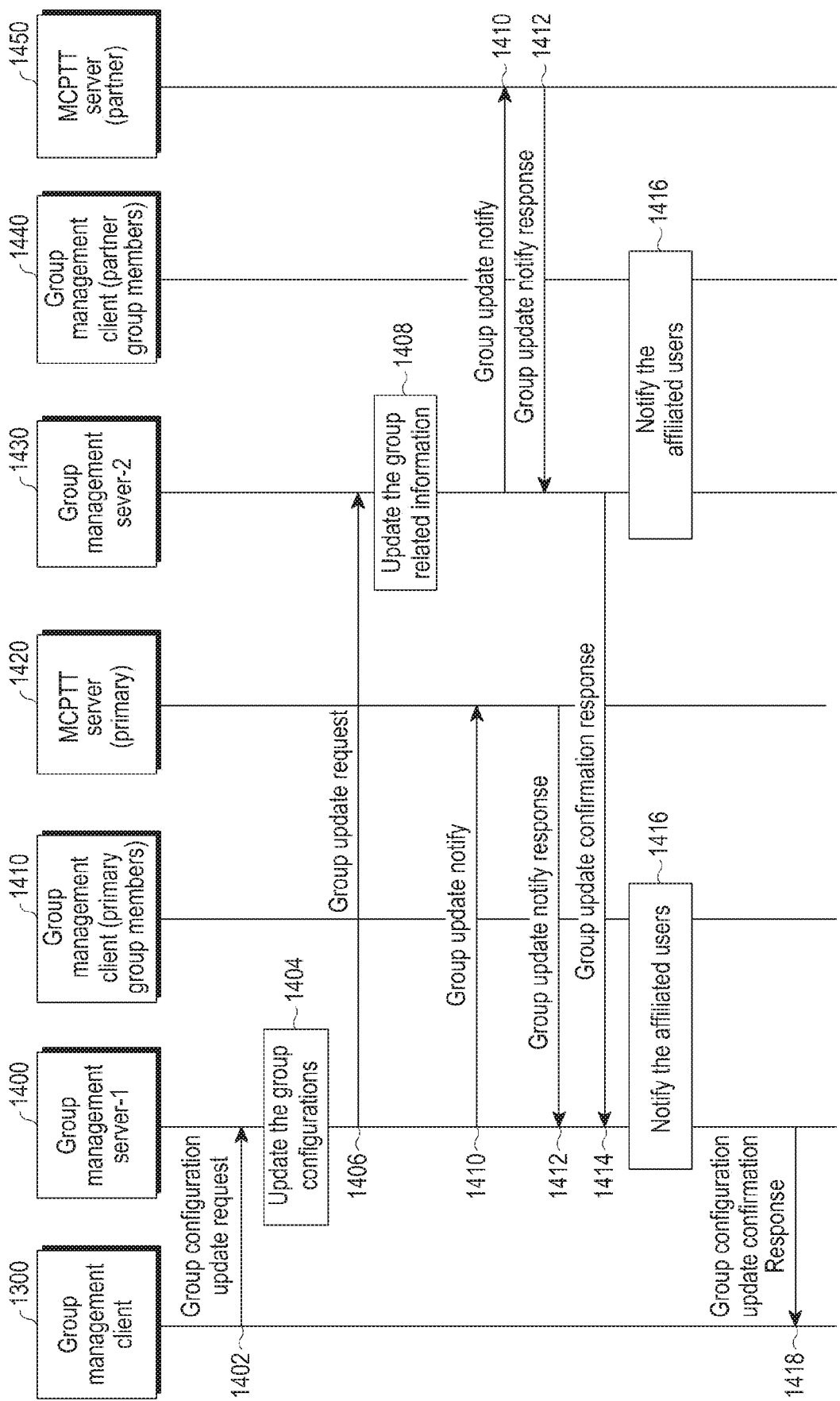
FIG. 14 is a sequence diagram of a method for managing dynamic group configuration in multiple MCPTT systems, according to an embodiment of the present disclosure.

FIG. 14 is a sequence diagram of a method for managing dynamic group configuration in multiple MCPTT systems, according to an embodiment of the present disclosure.

Referring to FIG. 14, an application plane procedure for managing dynamic group configuration in a multiple MCPTT system is provided. That is, in FIG. 14 a method is provided for dynamically updating the group configuration data associated with an MCPTT group, in a group management server. This procedure covers a group whose members are part of multiple MCPTT systems. The group subjected to update can be a normal group or a temporary group created as a result of a group-regroup operation, where multiple groups may be combined into a single group. If a dynamic change to group configuration data happens while a group call is in-progress for the group being updated, MCPTT servers inform floor control servers of any change relevant to floor control arbitration, e.g., a change in an audio cut-in policy. Subsequently, the group members may also be notified of the policy change.

In step 1402, a group management client 1300 of an administrator, dispatcher, or authorized MCPTT user of a primary MCPTT system sends a group configuration update request to a group management server-1 1400 of the primary MCPTT system. The identity of the groups) and the configuration parameters being updated shall be included in the message. For enabling an audio cut-in policy, the request includes an indication to enable audio cut-in. The request may include a temporary group ID in case of group-regroup groups.

At step 1404, the group management server-1 1400 updates the group configuration. During the group configuration update, the group management server-1 1400 updates the stored information of the group.

At step 1406, the group management server-1 1400 sends a group update request to a group management server-2 1430 of a partner MCPTT system to update the group configuration.

At step 1408, the group management server-2 1430 updates the stored information of the group.

At step 1410, the group management server-1 1400 notifies an MCPTT server (primary) 1420 in the primary MCPTT system regarding the group configuration update with the information of the updated parameters, and the group management server-2 1430 notifies MCPTT server (partner) 1450 in the partner MCPTT system regarding the group configuration update. The MCPTT servers 1420 and 1450 notify a floor control servers about the change in floor arbitration policy (e.g. audio cut-in disabled to audio cut-in enable, and vice versa)

At step 1412, the MCPTT servers 1420 and 1450 send a group update notify response to the group management server-1 1400 and the group management server-2 1430, respectively, to confirm the notification and update of relevant information in the server.

At step 1414, the group management server-2 1430 confirms the update to the group management server-1 1400 in a group update confirmation response.

At step 1416, the group management server-1 1400 notifies the group management client (primary group members) 1410 and the group management server-2 1430 notifies the group management client (partner group members) 1440 about the updated MCPTT group configuration data and the associated policy. At step 1418, the group management server-1 1400 provides a group update confirmation response to the group management client 1300 of the administrator, dispatcher, or authorized MCPTT user.

The embodiments disclosed herein can be implemented through at least one software program running on at least one hardware device and performing network management functions to control the elements. The elements disclosed herein include blocks which can be a hardware device, a software module, or a combination of a hardware device and a software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Therefore, while the present disclosure has been described in terms of certain embodiments, those skilled in the art will recognize that the embodiments described herein can be practiced with modification within the spirit and scope of the present disclosure, which is defined, not by the detailed description and embodiments described herein, but by the appended claims and their equivalents.

What is claimed is:

1. A method for managing mission critical push-to-talk (MCPTT) communication, the method comprising:
   receiving, by a floor control server, a first floor request message, from a primary floor participant, while a floor is granted to a secondary floor participant and a first media transmission is performed by the secondary floor participant;
   in response to receiving the first floor request message, transmitting, by the floor control server, to the secondary floor participant, a first floor revoke message for stopping the first media transmission of the secondary floor participant, and transmitting, by the floor control server, a first floor grant message to the primary floor participant; and
   transmitting, by the floor control server, a first floor taken message to the secondary floor participant, wherein the first floor taken message includes information of the primary floor participant granted the floor.

2. The method of claim 1, further comprising:
   receiving, by the floor control server, second media from the primary floor participant; and
   transmitting the second media to the secondary floor participant.

3. The method of claim 1, further comprising:
   receiving, by the floor control server, a second floor request message from the secondary floor participant, while the floor is granted to the primary floor participant and a second media transmission is performed by the primary floor participant;

in response to receiving the second floor request message, transmitting, by the floor control server, to the primary floor participant, a second floor revoke message for stopping the second media transmission of the primary floor participant, and transmitting, by the floor control server, a second floor grant message to the secondary floor participant.

4. The method of claim 3, further comprising transmitting, by the floor control server, a second floor taken message to the primary floor participant,
wherein the second floor taken message includes information of the secondary floor participant granted the floor.

5. The method of claim 4, further comprising:
receiving, by the floor control server, third media from the secondary floor participant; and
transmitting the third media to the primary floor participant.

6. A floor control server for managing mission critical push-to-talk (MCPTT) communication, the floor control server comprising:
a transceiver; and
at least one processor configured to control the transceiver to:
receive, from a primary floor participant, a floor request message while a floor is granted to the secondary floor participant and a first media transmission is performed by the secondary floor participant,
in response to receiving the first floor request message, transmit, to the secondary floor participant, a first floor revoke message for stopping the first media transmission of the secondary floor participant, and transmit a first floor grant message to the primary floor participant, and
transmit a first floor taken message to the secondary floor participant,
wherein the first floor taken message includes information of the primary floor participant granted the floor.

7. The floor control server of claim 6, wherein the at least one processor is further configured to control the transceiver to:
receive second media from the primary floor participant, and
transmit the second media to the secondary floor participant.

8. The floor control server of claim 6, wherein the at least one processor is further configured to:
control the transceiver to receive a second floor request message from the secondary floor participant while the floor is granted to the primary floor participant and a second media transmission is performed by the primary floor participant, and
in response to receiving the second floor request message, control the transceiver to transmit, to the primary floor participant, a second floor revoke message for stopping the second media transmission of the primary floor participant and transmit a second floor grant message to the secondary floor participant.

9. The floor control server of claim 8, wherein the at least one processor is further configured to control the transceiver to transmit a second floor taken message to the primary floor participant, and
wherein the second floor taken message includes information of the secondary floor participant granted the floor.

10. The floor control server of claim 9, wherein the at least one processor is further configured to control the transceiver to:
receive third media from the secondary floor participant, and
transmit the third media to the primary floor participant.

* * * * *